(12) United States Patent
Fan et al.

(10) Patent No.: US 9,277,091 B2
(45) Date of Patent: Mar. 1, 2016

(54) EMBEDDING INFORMATION IN PAPER FORMS

(71) Applicant: Xerox Corporation, Norwalk, CT (US)

(72) Inventors: Zhigang Fan, Webster, NY (US);
Reiner Eschbach, Webster, NY (US);
Saurabh Prabhat, Webster, NY (US);
Raja Bala, Pittsford, NY (US); Judith E. Stinehour, Rochester, NY (US);
Martin S. Maltz, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/091,904

(22) Filed: Nov. 27, 2013

(65) Prior Publication Data

US 2015/0146262 A1   May 28, 2015

(51) Int. Cl.
*H04N 1/405* (2006.01)
*H04N 1/32* (2006.01)
*G06T 1/00* (2006.01)

(52) U.S. Cl.
CPC ............ *H04N 1/32352* (2013.01); *G06T 1/005* (2013.01); *G06T 1/0028* (2013.01); *H04N 1/3224* (2013.01); *H04N 1/3232* (2013.01); *H04N 1/32261* (2013.01); *H04N 1/32309* (2013.01); *G06T 2201/0051* (2013.01); *G06T 2201/0062* (2013.01); *H04N 2201/3233* (2013.01)

(58) Field of Classification Search
CPC .................. H04N 1/32267; H04N 2201/327; H04N 1/32144; H04N 1/32149; H04N 1/32309; H04N 1/32325; H04N 21/8358; H04N 1/444; H04N 1/00037; H04N 1/00005; G06K 9/00442; G06K 9/62
USPC .................. 358/3.28, 1.9, 2.1, 468, 450, 448; 382/100, 170, 181–183, 193–194, 199, 382/204
See application file for complete search history.

(56) References Cited

U.S. PATENT DOCUMENTS

| | | |
|---|---|---|
| 7,292,710 B2 | 11/2007 | Fan et al. |
| 7,352,879 B2 | 4/2008 | Wang |
| 7,792,324 B2 | 9/2010 | Fan et al. |
| 7,801,325 B1 * | 9/2010 | Hetzel et al. .................. 382/100 |
| 7,952,767 B2 | 5/2011 | Sharma et al. |
| 8,224,019 B2 | 7/2012 | Fan et al. |
| 8,243,982 B2 | 8/2012 | Fan et al. |
| 8,335,342 B2 | 12/2012 | Fan et al. |
| 8,373,895 B2 | 2/2013 | Fan et al. |
| 8,482,807 B2 | 7/2013 | Fan et al. |
| 8,500,026 B2 | 8/2013 | Fan et al. |
| 2005/0025333 A1 * | 2/2005 | Fujii et al. ...................... 382/100 |
| 2010/0103470 A1 * | 4/2010 | Harada ......................... 358/3.28 |
| 2013/0228630 A1 | 9/2013 | Fan et al. |

* cited by examiner

*Primary Examiner* — Thomas D Lee
*Assistant Examiner* — Stephen M Brinich
(74) *Attorney, Agent, or Firm* — Fay Sharpe LLP

(57) ABSTRACT

This disclosure provides methods and systems of embedding and extracting information in a printed document. According to one exemplary embodiment, a method is provided wherein information is encoded by one or more partial or complete gaps in a line associated with a form, and the line gaps are patterned to provide N-bit codes.

24 Claims, 10 Drawing Sheets

| GENERIC FORM 1105 | | | |
|---|---|---|---|
| FIRST NAME 1110 | MIDDLE NAME 1115 | | LAST NAME |
| ADDRESS: STREET NAME | | | |
| CITY | STATE 1120 | | POSTAL CODE |
| | 1125 | 1130 | |
| HOME CONTACT NUMBER | | MOBILE NUMBER | |
| OCCUPATION | | EMAIL ID | |
| | | | |

FIG. 9

EMBEDDING INFORMATION IN PAPER FORMS

CROSS REFERENCE TO RELATED PATENTS AND APPLICATIONS

U.S. patent application Ser. No. 11/751,665, filed May 22, 2007, now U.S. Pat. No. 8,224,019, by Zhigang Fan et al., issued Jul. 17, 2012 and entitled "Embedding Information in Document Blank Space" and U.S. patent application Ser. No. 12/276,024, filed Nov. 21, 2008, now U.S. Pat. No. 8,243,982 B2, by Zhigang Fan et al., issued Aug. 14, 2012 and entitled "Embedding Information in Document Border Space", are incorporated herein by reference in their entirety.

BACKGROUND

Form is one type of the most frequently used document in the services business. There is often a need for embedding information in a paper form. The information could be used for various purposes, for example, verification, tampering prevention and process control. One application includes the mailing of forms to the general population as surveys. Currently, each of the pages on these forms may have a bar code which connects the form and page to an individual to whom the form was sent for completion. According to the disclosed methods and systems of embedding/extracting information, the bar code is eliminated by embedding the information in invisible or aesthetically pleasing marks.

While the technology described in this disclosure is applied to lines on forms, it can also be used for other type of documents.

Related art exists on encoding information via adding tiny dots/marks, see U.S. Pat. No. 8,224,019, by Fan et al., issued Jul. 17, 2012, entitled "EMBEDDING INFORMATION IN DOCUMENT BLANK SPACE"; U.S. Pat. No. 8,243,982, by Fan et al., issued Aug. 14, 2012, entitled "EMBEDDING INFORMATION IN DOCUMENT BORDER SPACE"; U.S. Pat. No. 7,792,324, by Fan et al., issued Sep. 7, 2010, entitled "SYSTEM AND METHOD FOR EMBEDDING MINIATURE SECURITY MARKS"; and U.S. Pat. No. 7,292,710, by Fan et al., issued Nov. 6, 2007, entitled "SYSTEM FOR RECORDING IMAGE DATA FROM A SET OF SHEETS HAVING SIMILAR GRAPHIC ELEMENTS". Each of the above-cited methods of encoding information has its own trade-off with respect to channel capacity, visibility, robustness, and complexity of encoding/decoding.

INCORPORATION BY REFERENCE

U.S. Pat. No. 8,224,019, by Fan et al., issued Jul. 17, 2012, entitled "EMBEDDING INFORMATION IN DOCUMENT BLANK SPACE";

U.S. Pat. No. 8,243,982, by Fan et al., issued Aug. 14, 2012, entitled "EMBEDDING INFORMATION IN DOCUMENT BORDER SPACE";

U.S. Pat. No. 7,792,324, by Fan et al., issued Sep. 7, 2010, entitled "SYSTEM AND METHOD FOR EMBEDDING MINIATURE SECURITY MARKS";

U.S. Pat. No. 7,292,710, by Fan et al., issued Nov. 6, 2007, entitled "SYSTEM FOR RECORDING IMAGE DATA FROM A SET OF SHEETS HAVING SIMILAR GRAPHIC ELEMENTS";

U.S. Pat. No. 8,335,342, by Fan et al., issued Dec. 18, 2012, entitled "PROTECTING PRINTED ITEMS INTENDED FOR PUBLIC EXCHANGE WITH INFORMATION EMBEDDED IN BLANK DOCUMENT BORDERS"; and, U.S. Pat. No. 8,373,895, by Fan et al., issued Feb. 12, 2013, entitled "PREVENTION OF UNAUTHORIZED COPYING OR SCANNING", are incorporated herein by reference in their entirety.

BRIEF DESCRIPTION

In one embodiment of this disclosure, described is a method of embedding information in a printed document comprising: a) receiving a digital image representation of a document to be printed; b) identifying one or more straight lines associated with the digital image representation of the document, each straight line including a first characteristic associated with a print of the document; c) dividing each identified straight line into a plurality of segments; d) encoding information into the one or more straight lines by encoding one or more partial or complete line gaps, the partial or complete line gaps associated with a portion of the straight line including a second characteristic of the straight line; and e) printing the digital image representation of the document including the encoded information.

In another embodiment of this disclosure, described is a system for embedding information in a printed document comprising: a memory; and a processor communicatively coupled to the memory for performing a method comprising: a) receiving a digital image representation of a document to be printed; b) identifying one or more straight lines associated with the digital image reproduction of the document, each straight line including a first characteristic associated with a print of the document; c) dividing each identified straight line into a plurality of segments; d) encoding information into the one or more straight lines by encoding one or more partial or complete line gaps, the partial or complete line gaps associated with a portion of the straight line including a second characteristic of the straight line.

In still another embodiment of this disclosure, described is a method of extracting embedded information in a printed document, the printed document including the embedded information in one or more straight lines including a first characteristic, a second characteristic, and one or more normally unperceivable partial or complete line gaps, the line gaps associated with a portion of the straight line including the second characteristic, the method comprising: a) receiving a digital image representation of the printed document including the embedded information; b) identifying the one or more straight lines including the embedded information associated with the digital image representation of the document; c) extracting from the identified one or more straight lines the embedded information by detecting the line gaps associated with the identified one or more straight lines; and d) mapping the detected line gaps to a code to generate a code representation of the embedded information.

In a still further embodiment of this disclosure, described is a system for extracting embedded information from a printed document comprising: a memory; and a processor communicatively coupled to the memory for performing a method comprising: a) receiving a digital image representation of the printed document including the embedded information; b) identifying the one or more straight lines including the embedded information associated with the digital image representation of the document; c) extracting from the identified one or more straight lines the embedded information by detecting the line gaps associated with the identified one or more straight lines; and d) mapping the detected line gaps to a code to generate a code representation of the embedded information.

BRIEF DESCRIPTION OF THE DRAWINGS

FIG. 9 is an example of a form with embedded information according to an exemplary embodiment of this disclosure.

DETAILED DESCRIPTION

This disclosure provides methods and systems to embed information in printed long lines using line gap patterns. As the line gaps are very sparse and very small, they are not perceptible by normal visual inspection. This disclosure and the exemplary embodiments herein, include both embedding and the detection processes which can be applied to both color and black and white printing devices. Some benefits of the disclosed methods and systems include, but are not limited to, providing hidden information on a printed form rather than using a traditional bar code, which may convey to some people an uneasiness that their submission of the form is being tracked.

Most forms contain many long lines that are used to separate different fields. Provided herein is an exemplary embodiment to embed information in printed long lines using line gap/gap patterns. As the line gaps are very sparse and very small, they are not perceptible for normal visual inspection. Both the embedding and the detection processes disclosed are relatively simple compared to most of the existing methods. The provided method can be applied to both color and black and white devices.

According to an exemplary method, included are an offline design stage, which decides the parameters for generating the line gap patterns, an online information embedding stage and an online information extraction stage.

Figure 1:
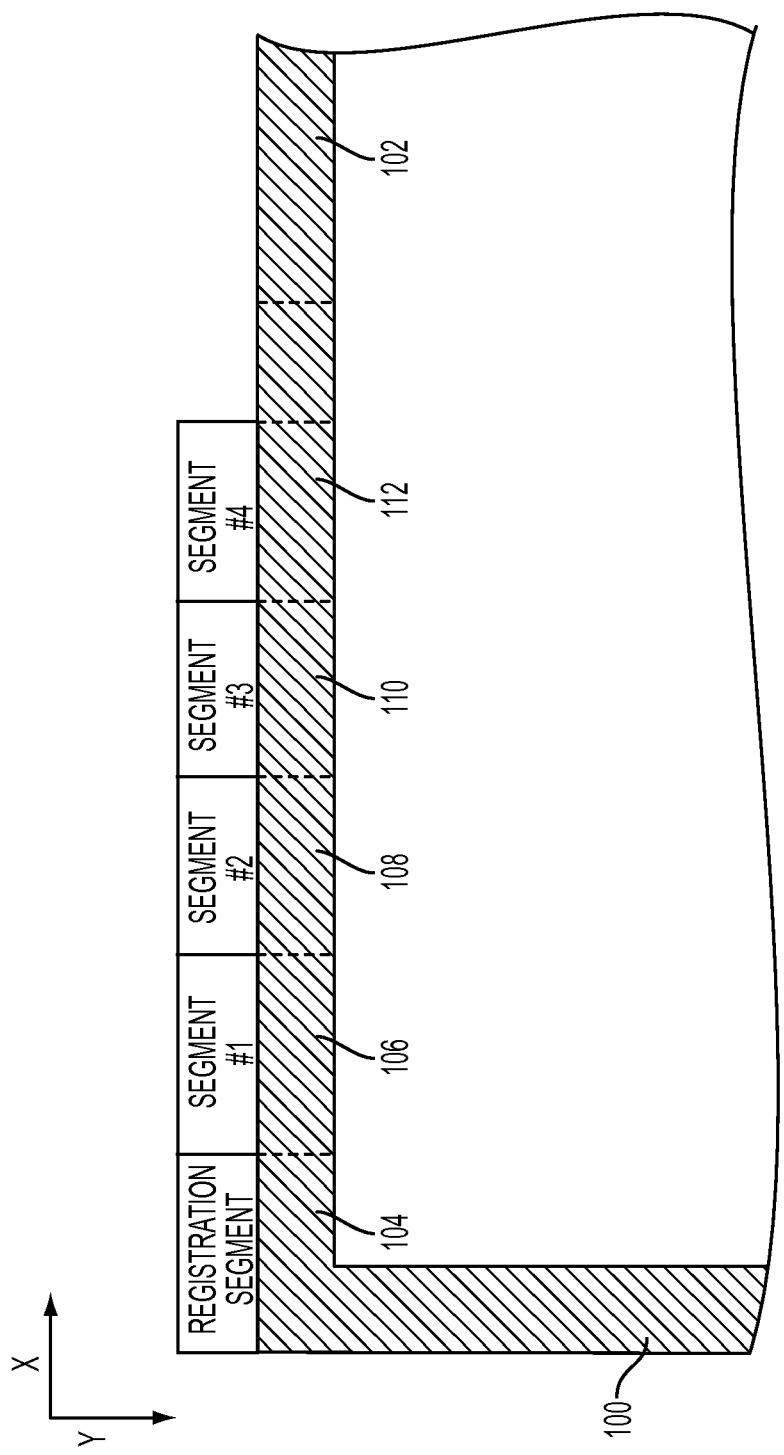
FIG. 1 illustrates exemplary embedded marks applied to a page of a hardcopy document according to an exemplary embodiment of this disclosure.
Figure 2:
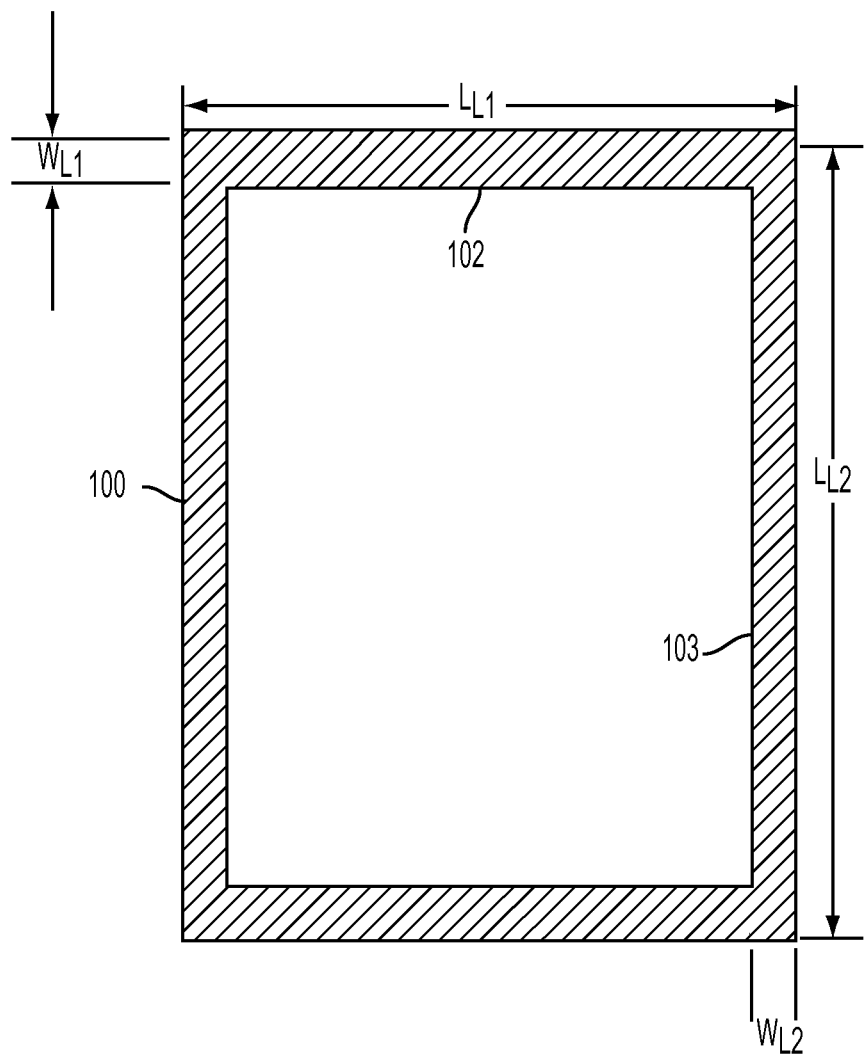
FIG. 2 is a schematic representation of a document page including a lined border incorporating embedded marks according to an exemplary embodiment of this disclosure.
Figure 3:
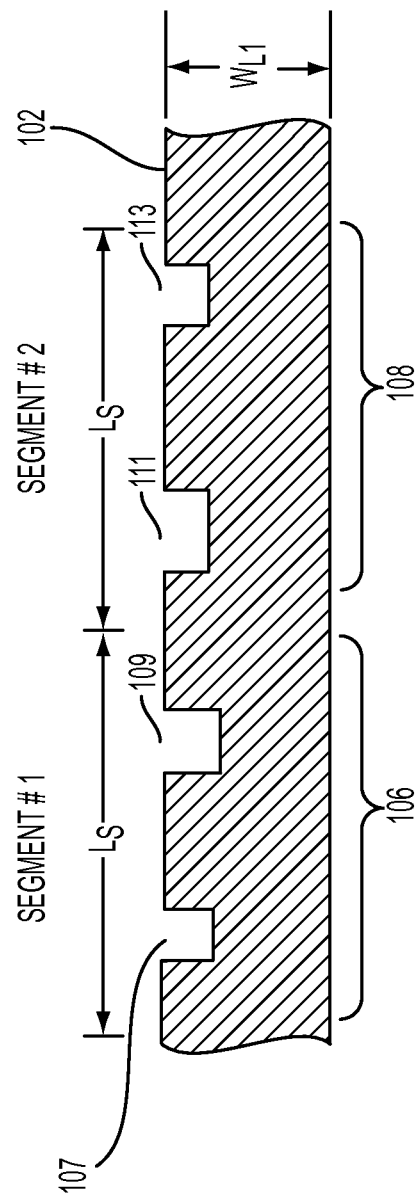
FIG. 3 is a portion of the horizontal line of FIG. 2 including embedded marks according to an exemplary embodiment of this disclosure.

With reference to FIG. 1, illustrated is an exemplary embedded mark applied to a page of a hardcopy document according to an exemplary embodiment of this disclosure. As shown, the embedded information, is included in a straight line 102 associated with a border 102 and 103 included in a document page 100, as illustrated in FIG. 2. The mark includes segment #1 106, segment #2 108, segment #3 110 and segment #4 112, according to the illustrated example. In addition, a registration segment 104 is provided which will be further described below. For purposes of the description which follows, each straight line associated with a document is defined by a length $L_{L1}$, $L_{L2}$, etc. as well as a respective width $W_{L1}$, $W_{L2}$, etc. In addition, as will be further described below, each segment is defined by a length $L_S$ and is encoded/embedded with information using a plurality of active cells including line gaps as shown in FIG. 3 as 107, 109, 111 and 113.

Now are described in further detail an offline design stage, an online information embedding stage and an online information extraction stage, according to exemplary embodiments of this disclosure.

Design Stage

A few design parameters are determined for each page during an offline design stage. Initially, the long lines in the page are detected, for example, lines 102 and 103 of FIG. 2. The minimum length $L_L$ of the lines is typically between ½ and 1 inch. For each line, a small amount of space is reserved for registration purposes and the rest of the line further divided into sections of equal length with a typical section length of L=½ and 1 inches. Each segment will be coded with B-bits, where B is determined as B=ceiling(total number of bits to be embedded/total number of segments).

Each segment is further divided into small cells. For a segment, if m cells are selected to be "active" from the segments total N cells, and a small line gap is inserted in each of the active cells, there will be C(m) possible patterns, where C(m)=N!/[N−m)!m!].

If m is chosen to be 0<m<M, where M is the maximum number of active cells per segment, the total number of patterns for the segment is C=[Σ$_{0<m<M}$C(m)].

Importantly, there are tradeoffs in the selection of M and the cell size. A smaller M means less dots per block and thus less visible, but it also means less information capacity. A smaller cell size implies greater N and more information capacity, however, it is less robust to registration error. The selection of N and M needs to ensure that

C≥2$^B$.

Lookup tables (LUTs) are established to link a B-bit code with its corresponding patterns, thereby enabling a pattern search from its code, or vice versa.

Registration marks are embedded at one or both ends of a line. They are also small gaps in the line. They may or may not share the same shape and size with the data line gaps.

Line information, such as starting and ending positions, and their registration marks, together with parameters L, B, N, and M, and the LUTs linking the binary codes and its corresponding patterns are shared by both the embedding and detection processes.

Information Embedding Stage

During embedding, the entire message is first divided into B-bit data groups. The information is encoded line by line according to the design parameters specified during the design procedure. Each line is first divided into segments of length L. Each segment embeds a group of B-bit information.

Figure 4:
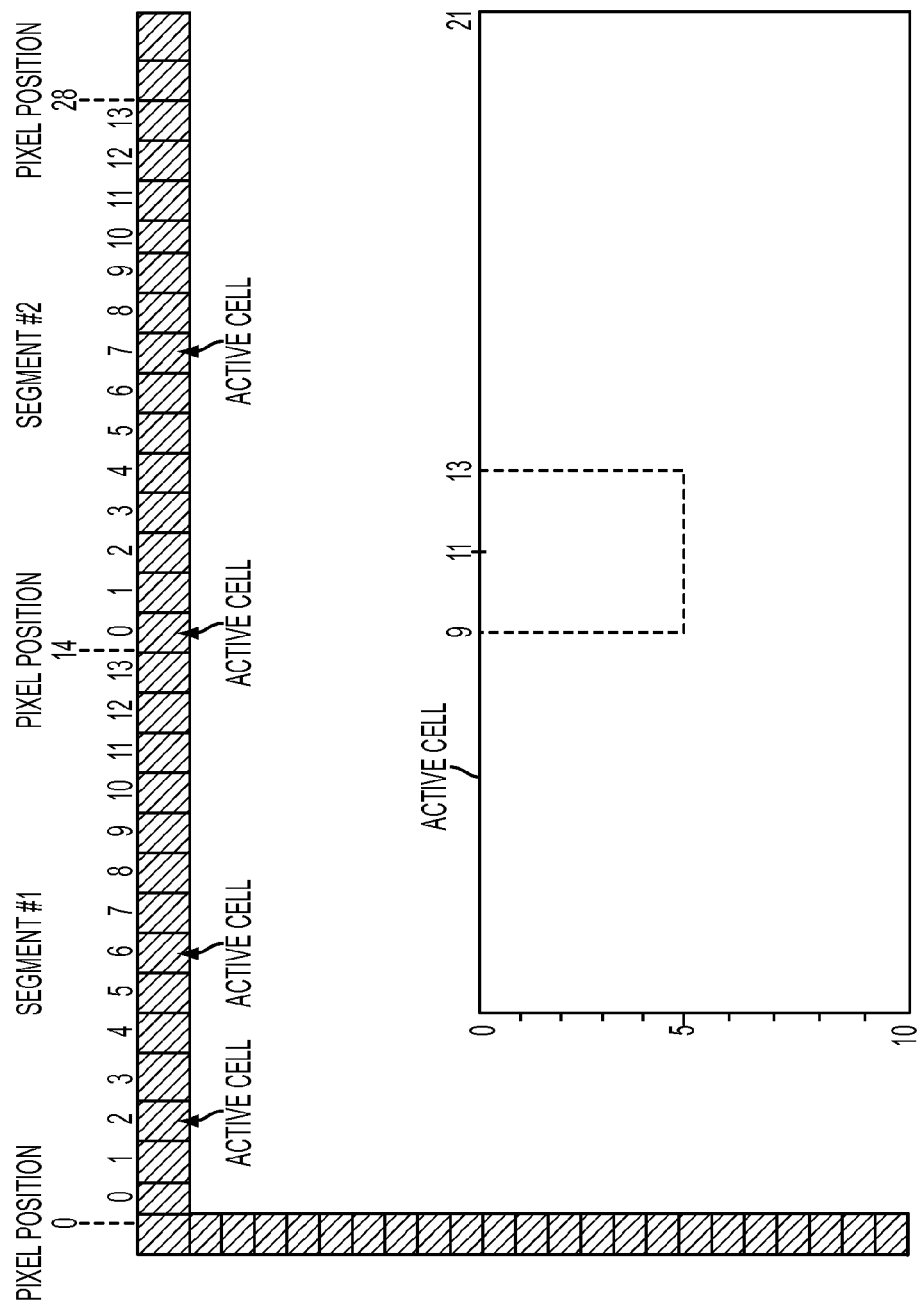
FIG. 4 is a portion of embedded marks according to an exemplary embodiment of this disclosure.

From the data group, the associated pattern can be found from the code-to-pattern LUT. The pattern is then embedded into the line. Specifically, the pattern specifies which cells should be turned "on" in the line segment. For an "on" cell, the center pixel or a small group of pixels in the center of the cell, is turned to white, i.e., the background color. This is illustrated in FIG. 4.

The registration marks are embedded at one or both ends of each line. They are also one or a group of pixels in the line that are turned to white, i.e., the background color. The leftmost mark in FIG. 4 is a registration mark. The registration mark may have the same shape and size as a data line gap. Their main difference is: the former's location is data independent and is known to the decoder, while the latter's location is data dependent.

While the exemplary embodiment of embedding information in a printed document is described using line gap patterns, it is to be understood a line gap can be a partial or complete line gap, a groove, line break, a spot, etc. In general, a line gap is associated with a straight line including a first characteristic which transitions to a second characteristic. The first and second line characteristics may be associated with line color, line tone, line pattern, line structure, etc., and may be normally unperceivable in the printed document or normally perceivable in the printed document.

Information Retrieval Stage

The information retrieval process contains 5 steps. The steps include: 1) global alignment; 2) line detection; 3) line registration; and 4) data retrieval and 5) decoding.

When a form with embedded information is digitally captured by a scanner or digital camera, it is first aligned with the form template. A general image alignment algorithm can be applied here. However, a more efficient method is to align using the lines in the form. The top, bottom, leftmost, and rightmost lines in the captured image are first detected. This can be accomplished by any known methods, e.g., Hough transform. Four corners are found as the intersections of the lines. Registering these four corners with their counterparts in the template provides align parameters, with which the captured image can be transformed to align with the template.

In the second step, long lines in the aligned image are detected in the vicinity of the locations determined in the design procedure. Again, this can be accomplished by any standard methods.

In the third step, the registration marks for the lines are extracted. The detection is guided by the location information specified in the design procedure. Specifically, a spot in the line that is much thinner than the average line thickness is searched in the vicinity of the location specified. The extracted registration marks provide even better local alignment than the global alignment.

Next, according to a fourth step, each line is divided into segments and each segment is divided into cells in the same manner as during encoding. Each cell is determined if it is "on". This is again accomplished by examining the line thickness. A cell containing a spot that is much thinner than the average line thickness is considered to be an "on" cell.

Finally, the line gap pattern, i.e., which cells are "on", obtained for the segment is decoded in the last step. The code associated with pattern is searched from the LUT. The codes from different segments are concatenated to form the retrieved message.

In one variant of this disclosure, the registration mark could be extended to include a simple "starter code", which provides not only alignment information but also conveys some information about the encoding scheme, e.g., parameter values N and M, used for that specific form. This enables the use of dynamic and/or individualized encoding/decoding schemes that optimally exploit the structure of a given form.

Figure 5:
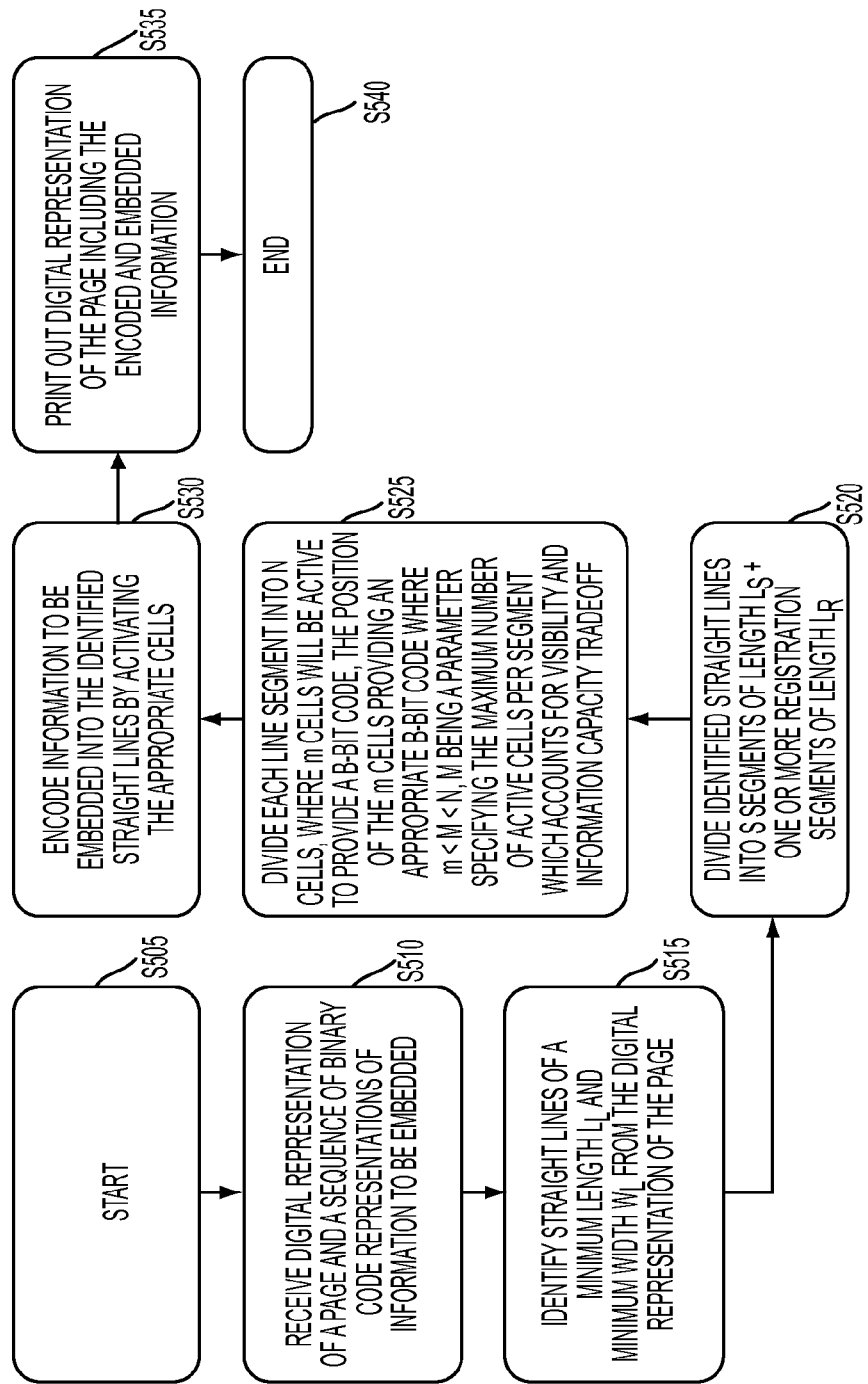
FIG. 5 is a flow diagram of a method of embedding information according to an exemplary embodiment of this disclosure.

With reference to FIG. 5, illustrated is a flow diagram of an exemplary method of embedding information, according to an exemplary embodiment of this disclosure.

Initially, the method starts S505.

Next, at S510, received is a digital representation of a page and a sequence of binary code representations of information to be embedded.

Next, at S515, the method identifies straight lines of a minimum length $L_L$ and minimum width $W_L$ from the digital representation of the page.

Next, at S520, the method divides identified straight lines into S segments of length $L_S$ plus one or more registration segments of length $L_R$.

Next, at S525, the method divides each line segment into N cells, where m cells will be active to provide a B-bit code, the position of the m cells providing an appropriate B-bit code where m<M<N, M being a parameter specifying the maximum number of active cells per segment which accounts for visibility and information capacity tradeoff.

Next, at S530, the method encodes information to be embedded into the identified straight lines by activating the appropriate cells.

Next, at S535, the method prints out the digital representation of the page including the encoded and embedded information.

Finally, at S540, the method ends.

Figure 6:
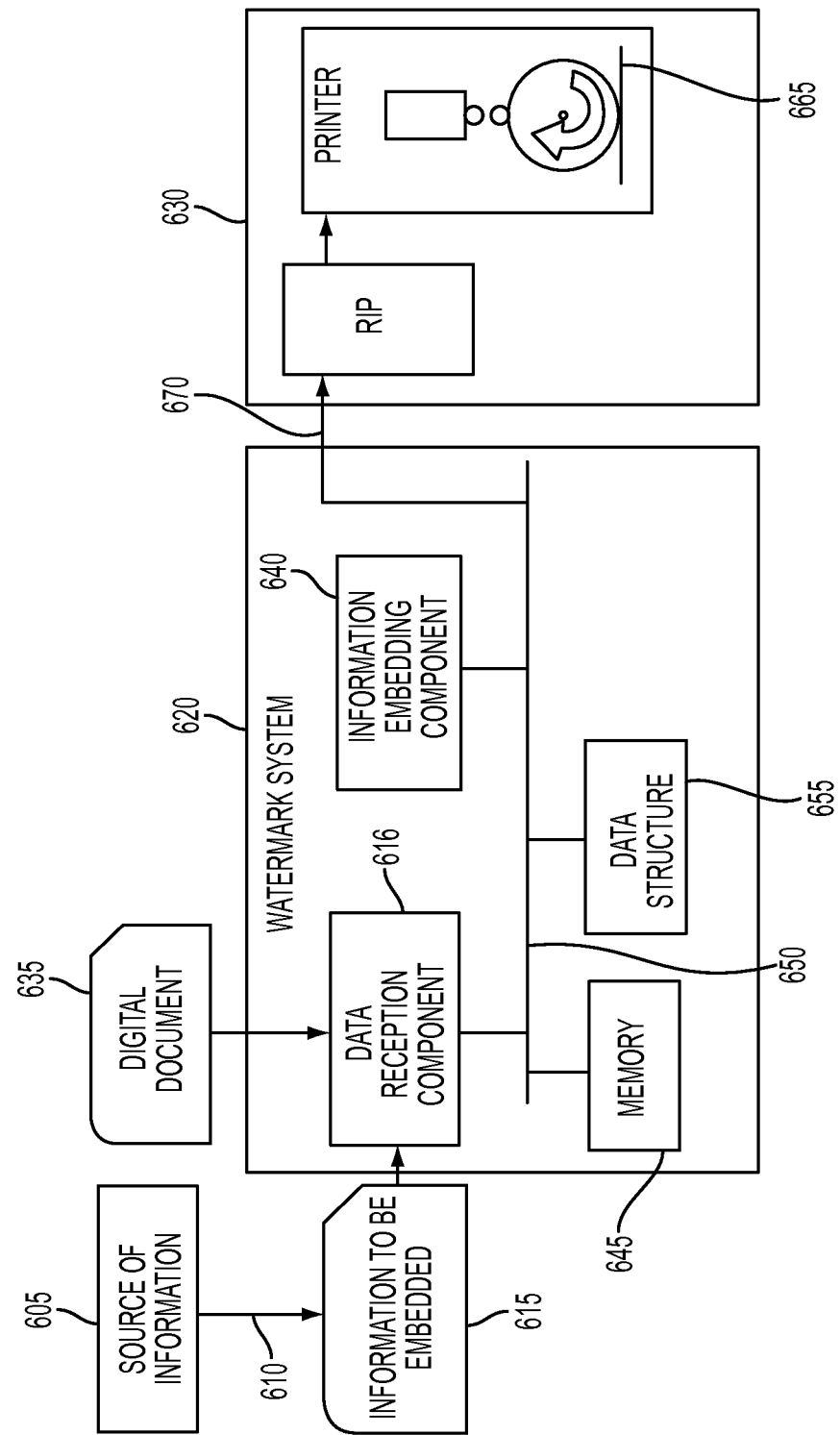
FIG. 6 is a block diagram of a system to embed information in a printed document according to an exemplary embodiment of this disclosure.

With reference to FIG. 6, an environment in which an information embedding method/system operates is illustrated. The system 620 generates and applies line gap patterns for embedding information in one or more documents in accordance with the method illustrated in FIG. 5.

The system 620 may be hosted by a suitable host processing device. The system 620 may comprise a single processing component, or be distributed across one or more processing components in one or more locations, e.g., on a client and server. The system 620 includes a data reception component 616, which receives input information 615 to be embedded, an information embedding component 640, which executes instructions for embedding the received information 615, a memory component 645, which stores the processing instructions, and a data structure 655, which links line gap patterns with information to be embedded, all interconnected by a data/control bus 650. The system 620 is in communication with an application component 630.

The data reception component 615 receives information from one or more sources of information 605. Such sources can be one or more databases, processing components, servers, workstations, scanning devices, memory storage devices, or the like which supply information in digital form. The system 620 also receives a digital document 635 in which the information 615 is to be embedded. Document 635 may be received from source 605 or another source.

Data 615 to be embedded can be representative of substantially any desired quantity such as origin of manufacture, date, time, serial number or simply an arbitrary alphanumeric string.

The information embedding component 640 communicates with the data reception component 616 and can convert received data into marks comprising a plurality of line gap patterns which are assigned to straight lines of a page of the digital document 635 in which the information represented by the line gap patterns is to be embedded. It will be appreciated that two or more of the system components 616, 640, 645, 655 may be combined or distributed as two or more separate components. For example, memory 645 may be combined with data reception component 616 and information embedding components 640 as a single chip. The host processor in which the system 620 is embodied may be a general purpose computing device, such as a desktop, laptop, or the like or may form a part of a dedicated device, such as a printer, copier, or multifunction device, which includes the application component 630.

The memory 645 can store instructions to be executed by the other components of the system 620 for performing the method of FIG. 5. Memory 645 may comprise any known type of data storage and/or transmission media, including magnetic media, optical media, random access memory (RAM), read-only memory (ROM), a data cache, a data object, etc. Moreover, memory 645 may reside at a single physical location, comprising one or more types of data storage, or be distributed across a plurality of physical systems in various forms.

The data structure 655 can be in any suitable format for associating a unique datum value with each of the dot patterns in the set of patterns, and which can be accessed for retrieving the pattern for an input datum value or vice versa. The data structure may include a simple look up table (LUT), search tree, or abstract dictionary. Data structure 655 may be stored in memory 645 or in a separate memory. The data structure may store at least 2 different line gap patterns, each corresponding to a unique datum value. In one embodiment, the number of unique line gap patterns stored may be at least 100, or at least 1000.

The source of information 605, host processor 616, and application component 650 may be interconnected by links 610, 670, for communication therebetween. Suitable links include one or more of wired and wireless links, internet or intranet connections, or the like.

The application component 630 is in communication with the system 620 and receives a digital document in which a line gap patterned mark has been embedded. The application component renders the watermarked digital document on a recipient, such as print media. As will be appreciated, this may include raster image processing (RIPing) the digital document whereby the image content, now including the embedded information, is converted to a format in which the image content can be rendered on the recipient 665.

The application component 630 can be any suitable device for marking a print medium, such as a xerographic printer, inkjet printer, bubble jet printer, or the like using appropriate colorants, such as toners or liquid or solid inks. The printer can be a stand-alone printer or a component of a multifunction device which may include printing, scanning, copying, and/or faxing capability. In a typical xerographic printer, for example, a photoconductive insulating member is charged to a uniform potential and thereafter exposed to a light image of an original document to be reproduced. The exposure discharges the photoconductive insulating surface in exposed or background areas and creates an electrostatic latent image on the member, which corresponds to the image areas contained within the document. Subsequently, the electrostatic latent image on the photoconductive insulating surface is made visible by developing the image with a developing material. Generally, the developing material comprises toner particles adhering triboelectrically to carrier granules. The developed image is subsequently transferred to a print medium, such as a sheet of paper, and fused thereto by applying heat to the toner with a heated roller and application of pressure.

Figure 7:
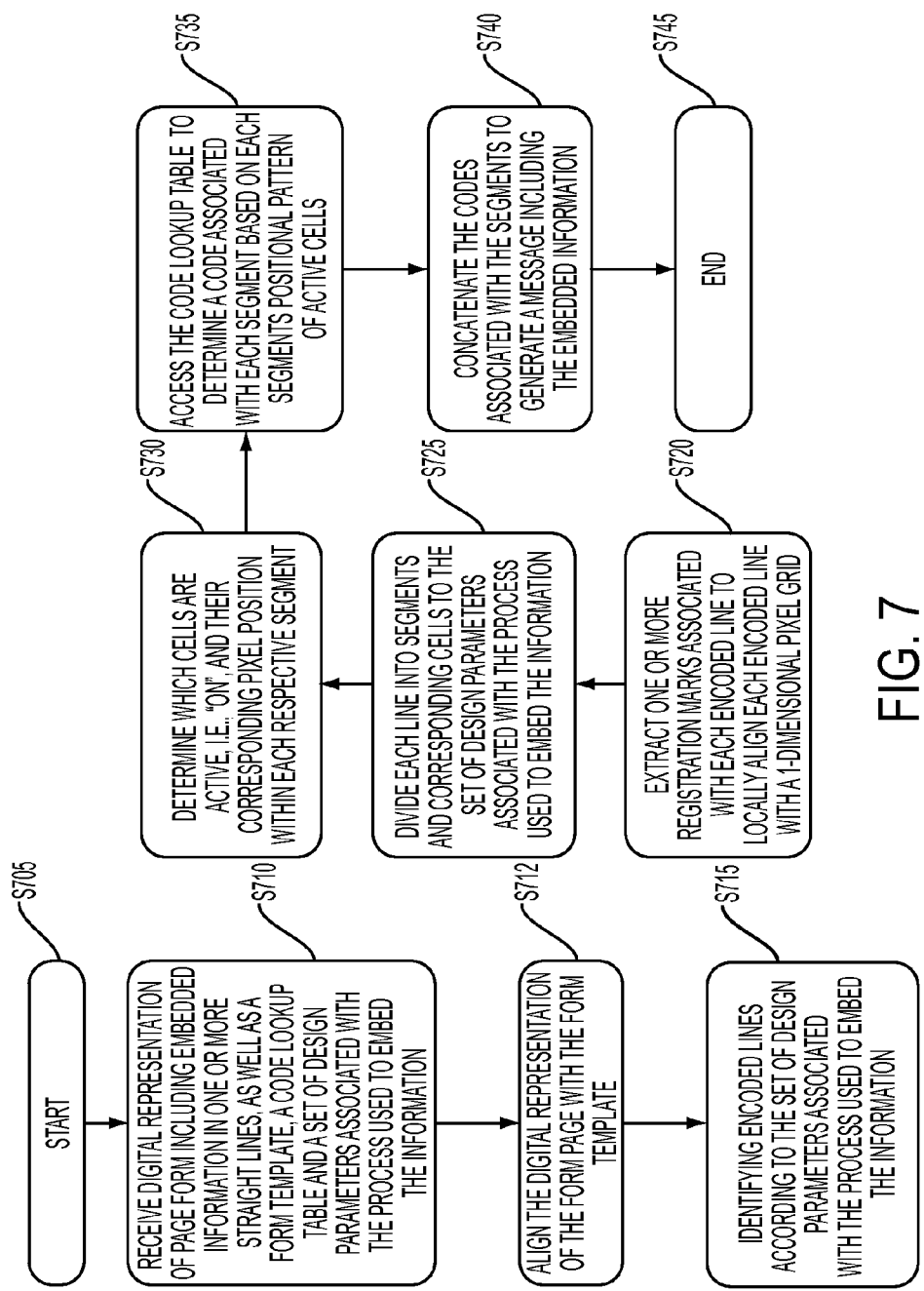
FIG. 7 is a flow diagram of a method of extracting and interpreting marks embedded in a printed document according to an exemplary embodiment of this disclosure.

With reference to FIG. 7, illustrated is a flow diagram of a method of extracting and interpreting embedded information in a printed document according to an exemplary embodiment of this disclosure.

Initially, the method starts at S705.

Next, at S710, the method receives a digital representation of a page form including embedded information in one or more straight lines, as well as a form template, a code lookup table and a set of design parameters associated with the process used to embed the information.

Next, at S712, the method aligns page image with the form template.

Next, at S715, the method identifies encoded lines according to the set of design parameters associated with the process used to embed the information.

Next, at S720, the method extracts one or more registration marks associated with each encoded line to locally align each encoded line with a 1-dimensional pixel grid.

Next, at S725, the method divides each line into segments and corresponding cells to the set of design parameters associated with the process used to embed the information.

Next, at S730, the method determines which cells are active, i.e., "on", and their corresponding pixel position within each respective segment.

Next, at S735, the method accesses the code lookup table to determine a code associated with each segment based on each segments positional pattern of active cells.

Next, at step S740, the method concatenates the codes associated with the segments to generate a message including the embedded information.

Finally, at S745, the method ends.

Figure 8:
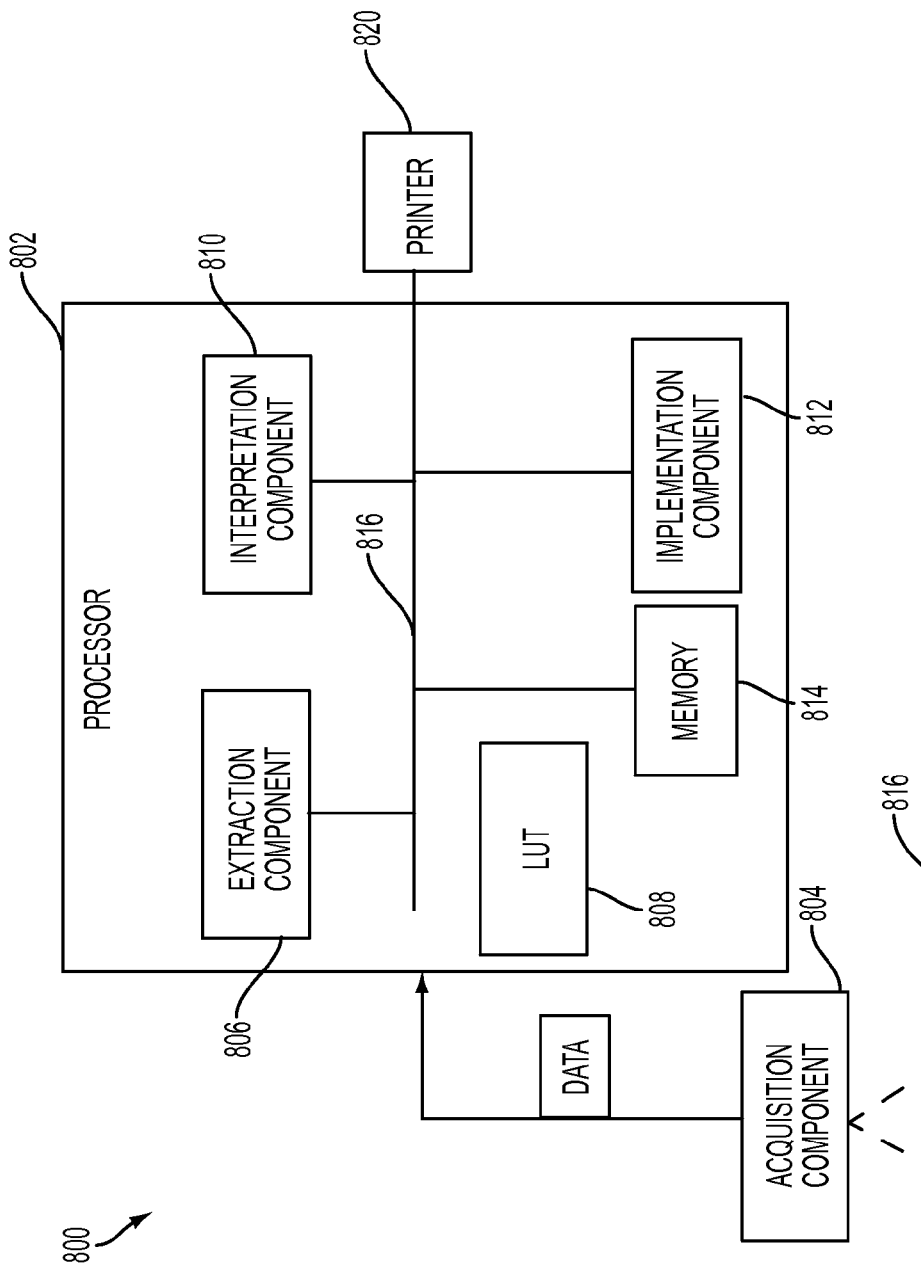
FIG. 8 is a functional block diagram of a system for extracting and interpreting information which has been embedded in a printed document according to an exemplary embodiment of this disclosure.

With reference to FIG. 8, illustrated is a functional block diagram of a system 800 for extracting and interpreting information which has been embedded in a printed document generally implementing the method described with reference to FIG. 7. The system includes a processor 802, which hosts various components for extracting embedded information, where present, optionally interpreting the embedded information, and automatically implementing a process based on the interpretation. The processor receives data acquired from a recipient 818 from an acquisition component 804. The processor 802 may include an extraction component 806, a data structure 808, an interpretation component 810, optionally an implementation component 812, and memory 814, all interconnected by a data control bus 816. The processor 802 may further be linked with an implementation device 820, such as a printer, which implements a computer implemented process, under the control of the host processor 802.

The acquisition component 804 may be a scanner which acquires image data from the recipient. In particular, a page of a document having one or more printed pages is processed by the scanner 804 to derive digital image data that represent the printed page in terms of a plurality of pixels arranged in rows and columns.

The host processor 802 may be a general purpose computing device which executes instructions stored in associated memory 814, similar to that described for the system illustrated in FIG. 6.

The extraction component 806 can be employed to detect information embedded in the scanned image data. The extraction component 806 searches for registration marks/lines and extracts any line gap patterns from straight lines embedded with information. The interpretation component 810 compares these to the patterns stored in the lookup table 808. The extraction and interpretation components can employ one or more algorithms to identify registration marks and segments, as well as straight lines, and extract information encoded as line gap patterns.

The lookup table 808 may be similarly configured to the lookup table of the embedding component illustrated in FIG. 6.

The implementation component 812 may determine whether to implement a computer implemented process based in whole or in part on the information extracted. The implemented process may include displaying information extracted, storing the information, outputting the information to an implementation device 820, allowing or denying printing of the recipient, or any other computer implemented process.

The above described teachings can be further arranged so as to lend themselves to access-controlled sites, as will herein below be further described. In access controlled sites there are disseminated documents which are not allowed off-site and for which it is thereby desirable for any copier/scanner located on-site to refuse to copy/scan, or in the alternative, copy/scan such documents only at very low or distorted resolution. Such a secured scanning feature is vital for organizations that handle sensitive documents, particularly for ultra-high security sites where no paper documents can leave the site. This may be achieved by utilizing the above taught methodologies during printing of the sensitive documents. Additional information is inserted to the sensitive documents to label them so as to flag to any on site scanner or copier machine that they are not to be scanned, nor are they to be copied. The amount of additional information needed to provide such indicia of "no-scan" or "no-copy" is small. When such a machine readable "no-scan" label is detected during copying/scanning operation, appropriate actions, such as stopping the operation or alerting the security will be taken.

EXAMPLE

An example form embedded with information using the disclosed method is illustrated in FIG. 9. Six long lines 1105, 1110, 1115, 1120, 1125 and 1130 were chosen, with a total of 88 segments, each segment length being 300 pixels for 600 dpi printing. According to this example, each segment contains 14 cells, the line gap size is 4×4 pixels, M is 2 and each segment has 105 different patterns, from which 32 are chosen to code 5 bits. The total information capacity is 440 bits according to this exemplary example.

Figure 10:
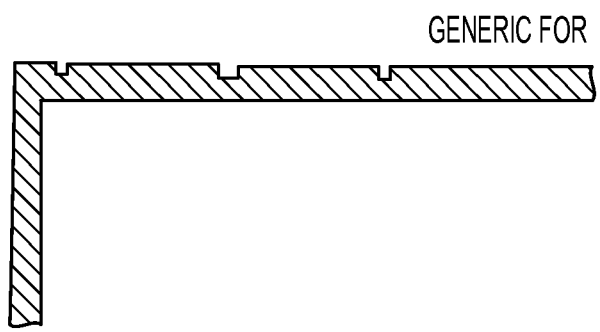
FIG. 10 shows a portion of the form illustrated in FIG. 9 including an active cell according to an exemplary embodiment of this disclosure.
Figure 11:
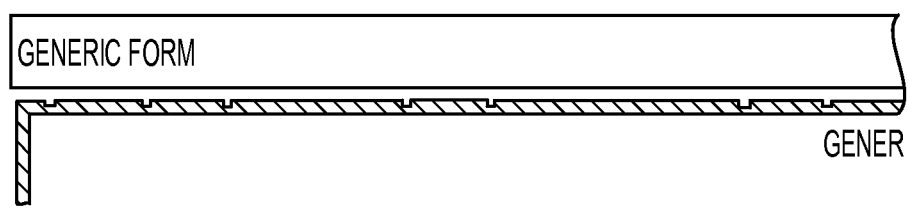
FIG. 11 shows a portion of a scanned file associated with the example form in FIG. 9.

A portion of a scanned image is shown in FIGS. 10 and 11 where the embedded data is extracted using the described method.

Table 1 below provides one exemplary example of a 5-bit code LUT which provides active cell pixel positions to encode/decode information embedded in the printed document according to the example provided.

TABLE 1

| 5-bit code | | |
|---|---|---|
| 5-bit code | Pivot Position of First Active Cell | Pivot Position of Second Active Cell |
| 0 | 0 | 3 |
| 1 | 0 | 4 |
| 2 | 0 | 5 |
| 3 | 0 | 6 |
| 4 | 0 | 7 |
| 5 | 0 | 8 |
| 6 | 0 | 9 |
| 7 | 0 | 10 |
| 8 | 1 | 4 |
| 9 | 1 | 5 |
| 10 | 1 | 6 |
| 11 | 1 | 7 |
| 12 | 1 | 8 |
| 13 | 1 | 9 |

TABLE 1-continued

| 5-bit code | | |
|---|---|---|
| 5-bit code | Pivot Position of First Active Cell | Pivot Position of Second Active Cell |
| 14 | 1 | 10 |
| 15 | 2 | 5 |
| 16 | 2 | 6 |
| 17 | 2 | 7 |
| 18 | 2 | 8 |
| 19 | 2 | 9 |
| 20 | 2 | 10 |
| 21 | 2 | 6 |
| 22 | 3 | 7 |
| 23 | 3 | 8 |
| 24 | 3 | 9 |
| 25 | 3 | 10 |
| 26 | 4 | 7 |
| 27 | 4 | 8 |
| 28 | 4 | 9 |
| 29 | 4 | 10 |
| 30 | 5 | 8 |
| 31 | 5 | 9 |

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing, or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals, e.g., carrier waves, infrared signals, digital signals, etc., just to mention a few examples.

The methods illustrated throughout the specification may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of embedding information in a printed document using an image processing system including a memory and a processor communicatively coupled to the memory for performing the method, the method comprising:
    a) receiving a digital image representation of a document to be printed;
    b) identifying one or more straight lines associated with the digital image representation of the document, each straight line including a first characteristic associated with a print of the document;
    c) dividing each identified straight line into a plurality of segments; and
    d) encoding information into the one or more straight lines by encoding one or more partial or complete line gaps, the partial or complete line gaps associated with a portion of the straight line including a second characteristic of the straight line; and
    e) printing the digital image representation of the document including the encoded information.

2. The method of embedding information in a printed document according to claim 1, wherein step c) reserves an initial portion of each identified straight line to embed a registration mark.

3. The method of embedding information in a printed document according to claim 1, wherein each of the plurality of segments includes a registration mark.

4. The method of embedding information in a printed document according to claim 1, wherein the first and second characteristics of the straight lines are associated with one or more of line color, line tone, line pattern, and line structure.

5. The method of embedding information in a printed document according to claim 1, wherein the line gap is one of a groove, line break and spot, and the line gap includes a portion of a straight line where the line thickness is less than the average thickness of the straight line.

6. The method of embedding information in a printed document according to claim 1, step c) comprising:
    c1) dividing each identified straight line into a plurality of segments; and
    c2) dividing each of the plurality of segments into N cells; and
    step d) comprising:
    encoding information into one or more straight lines by encoding one or more of the plurality of segments with one or more partial or complete line gaps within one or more active cells of each segment, the partial or complete line gaps associated with a portion of each active cell including the second characteristic of the straight line.

7. The method of embedding information in a printed document according to claim 6, wherein steps a), b) and c) are performed according to a set of predetermined encoding/decoding decision parameters, the parameters including one or more of:
    bits encoded per segment B;
    segment length $L_s$;
    cells per segment N;
    registration mark location $R_L$;
    number of active cells m;
    a bit code to gap pattern look-up table LUT;
    minimum length of straight line $L_L$; and
    minimum width of straight line $W_L$.

8. The method of embedding information into a printed document according to claim 1,
    step a) comprising: receiving a digital image representation of a template form page and a binary code sequence representation of information to be embedded in a printed version of the form.

9. The method of embedding information in a printed document according to claim 8, step c) comprising:
    c1) dividing each identified straight line into a plurality of segments; and
    c2) dividing each of the plurality of segments into N cells; and
    step d) comprising:
    encoding information into one or more straight lines by encoding one or more of the plurality of segments with one or more partial or complete line gaps within one or more active cells m of each segment, the partial or complete line gaps associated with a portion of each active cell including the second characteristic of the straight line.

10. The method of embedding information in a printed document according to claim 1, wherein the encoded information is associated with one or more of verification, tampering prevention, tracking and process control; and the one or more straight lines are oriented in one or more of horizontally, vertically and diagonally, relative to a layout of the digital representations of the document.

11. A system for embedding information in a printed document comprising:
   a memory; and
   a processor communicatively coupled to the memory for performing a method comprising:
   a) receiving a digital image representation of a document to be printed;
   b) identifying one or more straight lines associated with the digital image reproduction of the document, each straight line including a first characteristic associated with a print of the document;
   c) dividing each identified straight line into a plurality of segments; and
   d) encoding information into the one or more straight lines by encoding one or more partial or complete line gaps, the partial or complete line gaps associated with a portion of the straight line including a second characteristic of the straight line.

12. The system for embedding information in a printed document according to claim 11, wherein step c) reserves an initial portion of each identified straight line to embed a registration mark.

13. The system for embedding information in a printed document according to claim 11, wherein each of the plurality of segments includes a registration mark.

14. The system for embedding information in a printed documents according to claim 11, wherein the first and second characteristics of the straight lines are associated with one or more of line color, line tone, line pattern, and line structure.

15. The system for embedding information in a printed document according to claim 11, wherein the line gap is one of a groove, line break and spot, and the line gap includes a portion of a straight line where the line thickness is less than the average thickness of the straight line.

16. A method of extracting embedded information in a printed document using an image processing system including a memory and a processor communicatively coupled to the memory for performing the method, the printed document including the embedded information in one or more straight lines including a first characteristic, a second characteristic, and one or more normally unperceivable partial or complete line gaps, the line gaps associated with a portion of the straight line including the second characteristic, the method comprising:
   a) receiving a digital image representation of the printed document including the embedded information;
   b) identifying the one or more straight lines including the embedded information associated with the digital image representation of the document;
   c) extracting from the identified one or more straight lines the embedded information by detecting the line gaps associated with the identified one or more straight lines; and
   d) mapping the detected line gaps to a code to generate a code representation of the embedded information.

17. The method of extracting embedded information in a printed document according to claim 16, wherein one or both of the steps b) and c) detects line registration marks associated with one or more straight lines including the embedded information.

18. The method of extracting embedded information in a printed document according to claim 16, wherein the first and second characteristics of the straight lines are associated with one or more of line color, line tone, line pattern, and line structure.

19. The method of extracting embedded information in a printed document according to claim 16, wherein the line gap is one of a groove, line break and spot, and the line gap includes a portion of a straight line where the line thickness is less than the average thickness of the straight line.

20. The method of extracting embedded information in a printed document according to claim 16, step c) comprising:
   c1) dividing each identified straight line into a plurality of segments; and
   c2) dividing each of the plurality of segments into N cells; and
   step d) comprising:
   extracting from the identified one or more straight lines by decoding one or more of the plurality of segments with one or more partial or complete line gaps within one or more active cells M of each segment, the partial or complete line gaps associated with a portion of each active cell including the second characterization.

21. The method of extracting embedded information in a printed document according to claim 20, wherein steps a), b), c) and d) are performed according to a set of predetermined encoding/decoding decision parameters, the parameters including one or more of:
   bits encoded per segment B;
   segment length $L_s$;
   cells per segment N;
   registration mark location $R_L$;
   number of active cells m;
   a bit code to gap pattern look-up table LUT;
   minimum length of straight line $L_L$; and
   minimum width of straight line $W_L$.

22. The method of extracting embedded information in a printed document according to claim 16, step a) receiving a digital image representation of a form page including the embedded information, the form page incorporating a template form page and the information embedded in one or more straight lines of the form page also associated with the template form page.

23. The method of extracting embedded information in a private document according to claim 22, step c) comprising:
   c1) dividing each identified straight line into a plurality of segments; and
   c2) dividing each of the plurality of segments into N cells; and
   step d) comprising:
   extracting from the identified one or more straight lines by decoding one or more of the plurality of segments with one or more partial or complete line gaps within one or more active cells of each segment, the partial or complete line gaps associated with a portion of each active cell including the second characterization.

24. The method of extracting embedded information in a printed document according to claim 22, wherein the encoded information is associated with one or more of verification, tampering prevention, tracking and process control; and
   the one or more straight lines are oriented in one or more of horizontally, vertically and diagonally, relative to a layout of the digital representation of the document.

* * * * *